(12) United States Patent
Willeke et al.

(10) Patent No.: US 8,028,720 B2
(45) Date of Patent: Oct. 4, 2011

(54) VALVE BLOCK

(75) Inventors: Roshan Willeke, Karlsruhe (DE);
Marco Grethel, Bühlertal (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 452 days.

(21) Appl. No.: 12/214,406

(22) Filed: Jun. 17, 2008

(65) Prior Publication Data

US 2009/0065728 A1 Mar. 12, 2009

Related U.S. Application Data

(63) Continuation of application No. PCT/DE2006/002085, filed on Nov. 27, 2006.

(30) Foreign Application Priority Data

Dec. 17, 2005 (DE) .......................... 10 2005 060 570

(51) Int. Cl.
*F16K 11/10* (2006.01)
*F16K 11/24* (2006.01)
(52) U.S. Cl. ....................................... 137/884; 137/382
(58) Field of Classification Search .................. 137/377, 137/382, 884; 190/19
See application file for complete search history.

(56) References Cited

U.S. PATENT DOCUMENTS

| | | | | | |
|---|---|---|---|---|---|
| 75,358 | A | * | 3/1868 | Burnett, Jr. ...................... | 190/19 |
| 2,920,802 | A | * | 1/1960 | Cook ............................ | 224/328 |
| 3,244,193 | A | * | 4/1966 | Loveless .................... | 137/454.6 |
| 3,375,850 | A | * | 4/1968 | Aslan ............................ | 137/382 |
| 3,559,687 | A | * | 2/1971 | Aslan ....................... | 137/625.69 |
| 4,150,686 | A | * | 4/1979 | El Sherif et al. .............. | 137/377 |
| 5,020,570 | A | * | 6/1991 | Cotter ....................... | 137/596.12 |
| 5,479,845 | A | | 1/1996 | Kawamura et al. .............. | 91/514 |
| 5,520,546 | A | * | 5/1996 | Klinger et al. ................ | 439/140 |
| 5,522,431 | A | * | 6/1996 | Bonacorsi et al. ............ | 137/884 |
| 5,836,354 | A | * | 11/1998 | Amano et al. ................ | 137/884 |
| 5,915,409 | A | * | 6/1999 | Kaneko et al. ................ | 137/270 |
| 5,983,921 | A | * | 11/1999 | Miyazoe et al. .............. | 137/269 |
| 5,988,203 | A | * | 11/1999 | Hutton ......................... | 137/271 |
| 5,988,214 | A | * | 11/1999 | Tajima et al. ................. | 137/596 |
| 6,062,254 | A | * | 5/2000 | Brady et al. .................. | 137/382 |
| 6,079,798 | A | * | 6/2000 | Hosoya ...................... | 303/119.3 |
| 6,834,669 | B2 | * | 12/2004 | Seyfarth ........................ | 137/354 |
| 6,874,537 | B2 | * | 4/2005 | Hayashi et al. ................ | 137/884 |
| 6,892,764 | B2 | * | 5/2005 | Rodrigues et al. ............ | 137/884 |
| 2003/0098079 | A1 | * | 5/2003 | de Silva et al. ............... | 137/884 |

FOREIGN PATENT DOCUMENTS

DE 44 03 720 A1 8/1994
EP 0 627 349 A1 12/1994

* cited by examiner

*Primary Examiner* — John Fox
(74) *Attorney, Agent, or Firm* — Alfred J. Mangels

(57) ABSTRACT

The invention relates to a valve block, in particular a hydraulic valve block, which comprises a basic body having a base area and a plurality of blind holes, in particular valve bores, and lamellae, having a plurality of valve actuating devices, in particular electromagnets, and having a plurality of connections, in particular hydraulic connections. The invention is distinguished by the fact that the basic body has an encircling sealing surface, running obliquely relative to the base area, for a protective hood, in particular an oil pan.

13 Claims, 2 Drawing Sheets

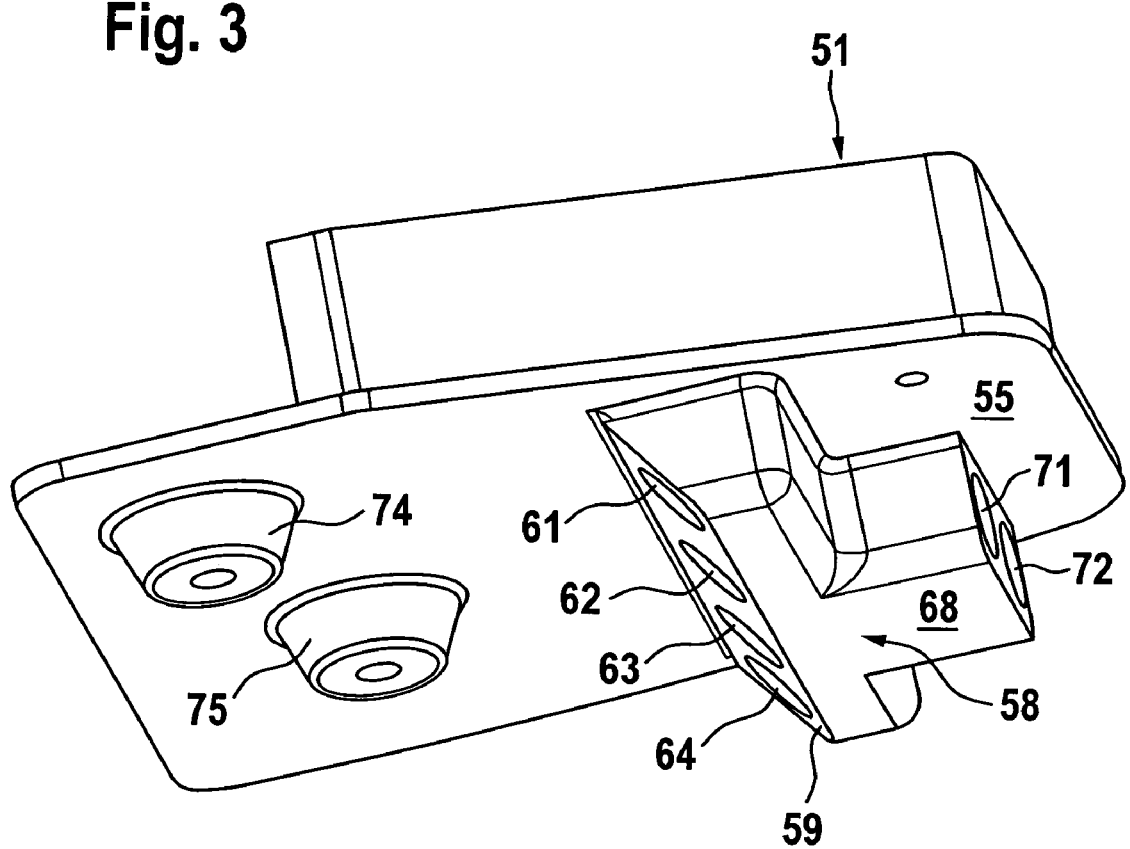

VALVE BLOCK

CROSS-REFERENCE TO RELATED APPLICATION

This is a continuation of International Application Serial No. PCT/DE2006/002085, having an international filing date of Nov. 27, 2006, and designating the United States, the entire contents of which is hereby incorporated by reference to the same extent as if fully rewritten.

BACKGROUND OF THE INVENTION

The present invention relates to a valve block, in particular a hydraulic valve block, which includes a basic body having a base area and a plurality of blind bores, in particular valve bores and lamellae, having a plurality of valve actuating devices, in particular electromagnets, and having a plurality of connections, in particular hydraulic connections.

An object of the present invention is to optimize a valve block with regard to the requisite construction space.

SUMMARY OF THE INVENTION

The object is achieved with a valve block, in particular a hydraulic valve block, which includes a basic body having a base area and a plurality of blind bores, in particular valve bores and lamellae. The valve block includes a plurality of valve actuating devices, in particular electromagnets, and a plurality of connections, in particular hydraulic connections, by the fact that the basic body has an encircling sealing surface, running obliquely relative to the base area, for a protective hood, in particular an oil pan. The basic body has essentially the form of a cuboid, and is of labyrinthine construction, equipped with a plurality of blind bores, in particular valve bores and lamellae. The valve bores serve, for example, to receive valve elements, in particular valve plungers. The lamellae serve to connect the valve bores to each other, with inlet ports and/or outlet ports for a hydraulic medium. The oblique position of the sealing surface simplifies access to the valve block on an attachment and processing surface that is situated perpendicular to the base area.

One preferred exemplary embodiment of the valve block is characterized in that the basic body has a step with an attachment surface, in particular a solitary attachment surface, for the valve actuating devices. The step makes it possible to accommodate the valve actuating devices within the protective hood in a simple manner.

Another preferred exemplary embodiment of the valve block is characterized in that the attachment surface for the valve actuating devices is situated perpendicular to the base area. That simplifies access with processing tools in the axial direction, i.e., parallel to the base area.

Another preferred exemplary embodiment of the valve block is characterized in that the attachment surface for the valve actuating devices has a plurality of blind bores, in particular valve bores. The blind bores are provided in the attachment surface and the basic body before the valve actuating devices are installed. Preferably, all valve bores of the basic body are provided in the attachment surface.

Another preferred exemplary embodiment of the valve block is characterized in that the basic body has a functional surface, in particular a solitary functional surface, with additional blind bores, in particular lamellae. Due to the additional blind bores, in particular lamellae, the blind bores made in the attachment surface, in particular valve bores, are partially connected to each other in labyrinthine construction. Preferably, all lamellae of the basic body are provided in the functional surface.

Another preferred exemplary embodiment of the valve block is characterized in that the functional surface is situated parallel to the base area. That simplifies working on the valve block.

Another preferred exemplary embodiment of the valve block is characterized in that a cover piece is attached to the functional surface. The cover piece serves to seal the blind bores in the basic body. Furthermore, the cover piece can be provided with additional blind bores. Preferably, an intermediate plate is clamped between the functional surface and the cover piece.

Additional preferred exemplary embodiments of the valve block are characterized in that the valve body has a further functional surface with blind bores, in particular lamellae, and/or a further attachment surface for additional valve actuating devices, with a plurality of blind bores, in particular valve bores. That heightens the functionality of the valve block.

Another preferred exemplary embodiment of the valve block is characterized in that the additional attachment surface is situated in the same plane as the attachment surface of the basic body. The additional attachment surface preferably directly adjoins the attachment surface of the basic body.

Another preferred exemplary embodiment of the valve block is characterized in that the basic body has a connection surface with a plurality of connections, in particular hydraulic connections, on its side facing away from the attachment surface. This arrangement simplifies access to the connections, without which the available labyrinthine construction space would be affected adversely.

Another preferred exemplary embodiment of the valve block is characterized in that the contact surface runs perpendicular to the base area. Preferably, the connections are situated outside of the protective hood.

Another preferred exemplary embodiment of the valve block is characterized in that the base area has an elevated area having at least one additional connection surface with additional connections, in particular hydraulic connections. The additional connections simplify linking to already existing line systems.

Another preferred exemplary embodiment of the valve block is characterized in that the sealing surface of the basic body is connected in a sealing manner to a sealing surface of a protective hood, in particular an oil pan. The protective hood serves to enclose the valve block.

BRIEF DESCRIPTION OF THE DRAWINGS

Additional advantages, features and details of the invention can be seen from the following description, in which various exemplary embodiments are described in detail with reference to the drawings. The figures show the following:

FIG. 3: a perspective depiction of a valve block according to a second exemplary embodiment.

DESCRIPTION OF THE PREFERRED EMBODIMENTS

Figure 1:
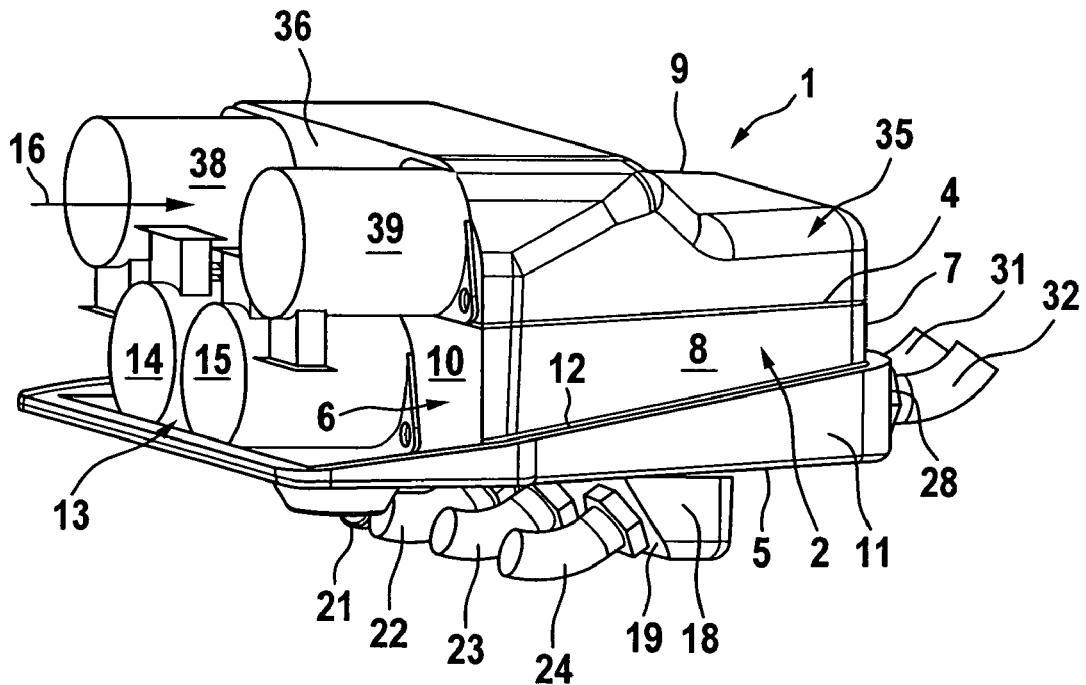
FIG. 1: a perspective depiction of a valve block according to a first exemplary embodiment.
Figure 2:
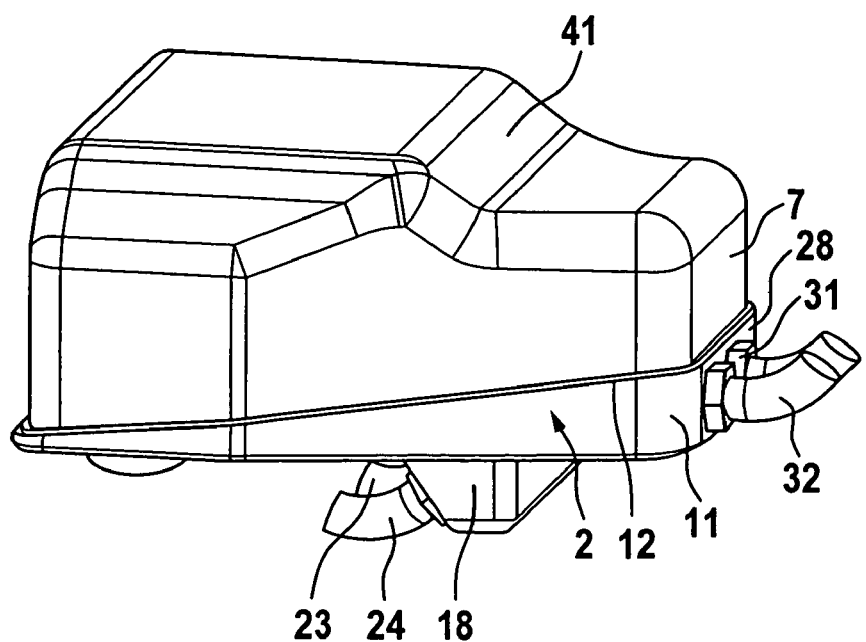
FIG. 2: a perspective depiction of the valve block of FIG. 1 with a protective hood placed on top.

FIGS. 1 and 2 show a valve block 1 in perspective view from different viewing angles. Valve block 1 includes a basic body 2, which essentially has the form of a cuboid. Due to the essentially cuboid shape of basic body 2, the latter is also described as the base plate. Basic body 2 has a flat top side 4 and a flat bottom side 5. In addition, basic body 2 has a front side 6 and a back side 7. Finally, basic body 2 is delimited on the sides by two lateral faces 8 and 9. The front side 6, back side 7, and lateral faces 8, 9 are essentially of flat design, and are joined to each other by sloping surfaces and/or roundings.

According to an essential aspect of the present invention, basic body 2 is connected to an encircling shoulder 11. Encircling shoulder 11 extends around the entire periphery of basic body 2. In the area of the front side 6 and the back side 7 the height of the shoulder is constant. In the area of the lateral faces 8, 9 the encircling shoulder 11 has the form of a ramp, which rises continuously from the front side 6 to the back side 7 of basic body 2. The top side, i.e., the side of encircling shoulder 11 facing away from the bottom side 5, forms a sealing surface 12 for a protective hood (41 in FIG. 2).

Basic body 2 has a step 13 on its front side 6. Step 13 is formed by an attachment surface 10, which is situated on the front side 6 of basic body 2 perpendicular to the bottom side 5, which is also referred to as the base surface. The two lateral faces 8 and 9 are likewise situated perpendicular to base area 5. The back side 7 is likewise situated perpendicular to base area 5. The two lateral faces 8, 9 are situated perpendicular to the front side 6 and the back side 7.

Step 13 extends from attachment surface 10 as an extension of base area 5. Step 13 is enclosed by encircling shoulder 11. According to another essential aspect of the invention, attachment surface 10 is provided with a plurality of blind bores, in particular valve bores. Among other purposes, the blind bores serve to receive valve plungers. The valve plungers are operated with the aid of valve actuating devices 14 and 15, which are attached to attachment surface 10. The valve actuating devices are, for example, electromagnets.

The valve actuating devices are situated completely in the area of the step 13, which is enclosed by the encircling shoulder 11. The axial processing direction, in which the blind bores are formed in the attachment surface 10, is indicated by an arrow 16. According to an essential aspect of the invention, the valve actuating devices 14, 15 are placed only on the front side 6 of the basic body 2. The step 13, which is formed by a projection extending in the opposite direction to arrow 16, simplifies the enclosure of the valve actuating devices by the protective hood 41 (in FIG. 2). The oblique course of the encircling sealing surface 12 on the lateral faces 8, 9 of basic body 2 improves access to attachment surface 10 significantly.

On the bottom side 5 of basic body 2, which is also referred to as the base surface, an elevated area 18 is formed which forms a connection console with a connection surface 19. Four hydraulic connections 21 through 24 are attached to connection surface 19. Connection surface 19 is situated at an angle of about 70 degrees relative to the base area 5. Furthermore, an additional connection surface 28 with additional hydraulic connections 31, 32 is provided on the back side 7 of basic body 2. The additional connection surface 28 on the back side 7 of basic body 2 is formed on the encircling shoulder 11. That ensures that the additional connections 31, 32 are not covered by protective hood 41, as shown in FIG. 2.

The top side of basic body 2 has a flat functional surface 4, which is situated parallel to base area 5. This functional surface is equipped with a plurality of blind bores in the form of lamellae, which partially connect the valve bores with each other. In addition, the lamellae serve to join the valve bores with connections 21 through 24 and 31, 32. A cover piece 35 that has an additional flat functional surface on its side facing basic body 2 is set on the top side 4 of basic body 2. The flat functional surface is equipped with additional blind bores in the form of lamellae. The cover piece has essentially the form of a cuboid, and therefore is also referred to as cover plate 35. Cover plate 35 has on its front side 36 an additional attachment surface, which is situated in the same plane as attachment surface 10 of basic body 2. The additional attachment surface on the front side 36 of cover piece 35 is equipped with additional blind bores in the form of valve bores. Furthermore, additional valve actuating devices 38, 39 in the form of electromagnets are attached to the attachment surface on the front side 36 of cover piece 35.

The one-sided arrangement of the valve actuating devices 14, 15 and 38, 39 results in the back side 7 of basic body 2 being available for the hydraulic connections 31, 32. In FIG. 2 it can be seen that the complete enclosure of valve actuating devices 14, 15 and 38, 39 with the aid of protective hood 41, which is also referred to as an oil pan, is not impaired. Hydraulic connections 21 through 24 and 31, 32 are situated outside of protective hood 41.

FIG. 3 depicts a perspective view of an exemplary embodiment of a valve block 51 similar to valve block 1 in FIG. 1. Valve block 51 has a spaced area 58 on its bottom side 55, with a connection surface 59. Four connection points 61 through 64 for hydraulic connections are provided on connection surface 59. On the side opposite connection surface 59, spaced area 58 has an essentially cuboid-shaped extension 68, whose end facing away from connection surface 59 is equipped with additional connection points 71, 72. That further improves the freedom of design when connecting hydraulic lines to valve block 51. Furthermore, it can be seen in FIG. 3 that two raised areas 74 and 75 essentially in the nature of truncated cones are provided on the bottom side 55 of valve block 51. The two raised areas 74 and 75 serve to attach valve block 51 to a supporting structure (not shown) of a motor vehicle, with damping elements interposed.

The invention claimed is:

1. A hydraulic valve block comprising: a basic body having a base surface and a plurality of blind valve bores and lamellae, a plurality of valve actuating devices including electromagnets, and a plurality of hydraulic connections, wherein the basic body has a surrounding, outwardly-extending shoulder defining an outwardly-extending peripheral sealing surface running obliquely relative to the base surface and extending completely along a pair of opposite sides between lateral ends of the basic body for receiving and engaging with a protective hood having a top surface that overlies a portion of the basic body and is parallel to the base surface, wherein the base surface includes mounting areas for mounting the valve block to a supporting surface, and wherein the basic body has an outwardly-extending step with an upwardly-extending attachment surface for receiving and mounting the valve actuating devices.

2. A valve block according to claim 1, wherein the attachment surface for the valve actuating devices is perpendicular to the base surface.

3. A valve block according to claim 1, wherein the attachment surface for the valve actuating devices has a plurality of blind holes defining valve bores communicating with the valve actuating devices.

4. A valve block according to claim 1, wherein the basic body has a solitary functional surface with a plurality of blind bores, wherein the functional surface is between the base surface of the basic body and a top surface of the protective hood.

5. A valve block according to claim 4, wherein the functional surface extends parallel to the base surface.

6. A valve block according to claim 4, wherein a cover plate is attached to and overlies the functional surface.

7. A valve block according to claim 6, wherein the cover plate has an additional functional surface with blind bores.

8. A valve block according to claim 6, wherein the cover plate has an additional attachment surface extending toward the base surface for mounting additional valve actuating devices, with a plurality of blind valve bores.

9. A valve block according to claim 8, wherein the additional attachment surface is coplanar with the attachment surface of the basic body.

10. A valve block according to claim 1, wherein the basic body has an outer connection surface with a plurality of hydraulic connections on a side facing in a direction opposite to the attachment surface.

11. A valve block according to claim 10, wherein the outer connection surface extends perpendicular to the base surface.

12. A valve block according to claim 1, wherein the base includes a downwardly-extending raised area having at least one additional connection surface with additional hydraulic connections.

13. A valve block according to claim 1, wherein the peripheral sealing surface of the basic body is sealingly connected to a corresponding sealing surface of the protective hood.

* * * * *